United States Patent [19]

Kitokovsky

[11] Patent Number: 4,878,271

[45] Date of Patent: Nov. 7, 1989

[54] TONGUE ASSEMBLY

[75] Inventor: Alexander P. Kitokovsky, Oak Park, Mich.

[73] Assignee: TRW Vehicle Safety Systems Inc., Lyndhurst, Ohio

[21] Appl. No.: 256,983

[22] Filed: Oct. 13, 1988

[51] Int. Cl.$^4$ ............................................. A44B 11/10
[52] U.S. Cl. .......................................... 24/194; 24/196
[58] Field of Search .................... 24/194, 196, 171; 297/482, 483, 476

[56] References Cited

U.S. PATENT DOCUMENTS

| | | | |
|---|---|---|---|
| 3,189,963 | 6/1965 | Warner et al. | 24/196 |
| 3,414,947 | 12/1968 | Holmberg et al. | 24/196 |
| 3,538,558 | 11/1970 | Croft . | |
| 3,928,895 | 12/1975 | Klink | 24/196 |
| 3,975,800 | 8/1976 | Farlind . | |
| 4,069,554 | 1/1978 | Minolla et al. . | |
| 4,372,012 | 2/1983 | Fohl | 24/194 |
| 4,386,452 | 6/1983 | Stephenson | 24/196 |
| 4,473,926 | 10/1984 | Ono . | |

Primary Examiner—Victor N. Sakran
Attorney, Agent, or Firm—Tarolli, Sundheim & Covell

[57] ABSTRACT

An improved tongue assembly is used in a safety apparatus having a belt for restraining movement of an occupant of a vehicle. The tongue assembly includes a base having an opening through which the belt extends. A metal bar spans the opening in the base so that the belt extends through the opening, across the bar and back through the opening. A cover interconnects the base and opposite end portions of the bar. The belt engages an intermediate portion of the bar. In one embodiment of the invention, the bar and cover are slidable together relative to the base. In another embodiment of the invention, the bar slides relative to the cover and the base.

7 Claims, 4 Drawing Sheets

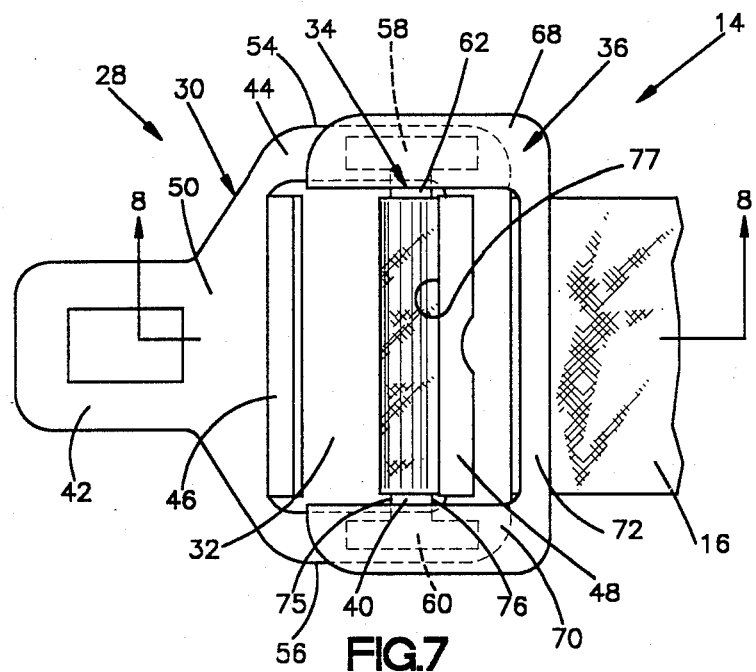
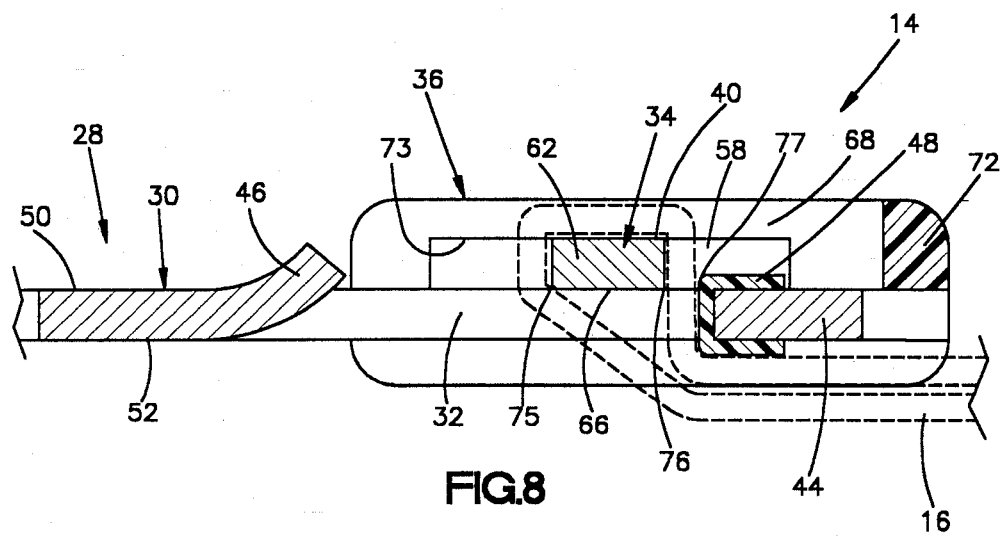

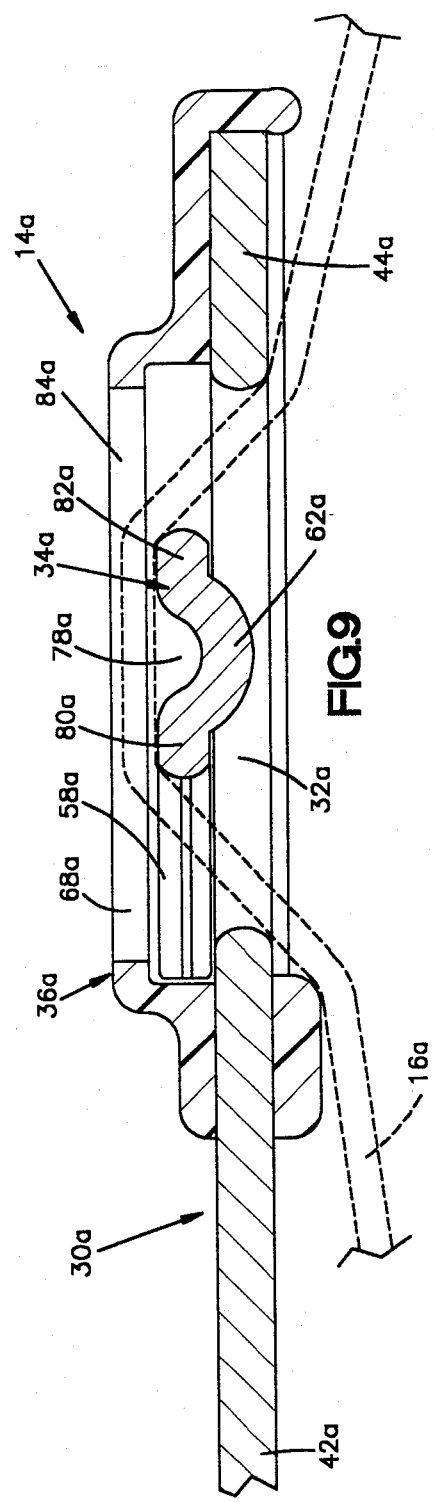
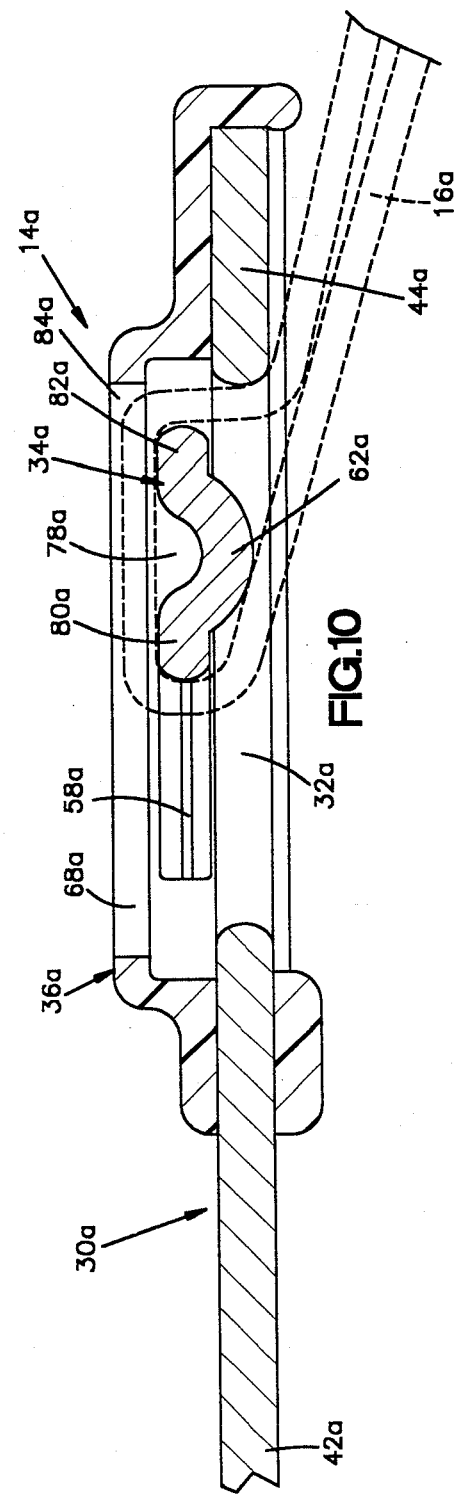

TONGUE ASSEMBLY

BACKGROUND OF THE INVENTION

The present invention relates to a tongue assembly for use in a safety apparatus having a belt for restraining movement of an occupant of a vehicle.

Many known vehicle safety systems have a tongue assembly which is used to connect a belt with a buckle in order to restrain movement of an occupant of the vehicle. The tongue assembly must be capable of transmitting relatively large forces in order to restrain an occupant of the vehicle against movement in the event of a sudden deceleration of the vehicle. The tongue assembly should also be thin to minimize interference with the occupant of the vehicle. In addition to being capable of transmitting large forces and being thin, the tongue assembly should be easy to manufacture in order to minimize the cost of making the tongue assembly.

When the tongue assembly is released from the buckle, the belt is wound onto a retractor. As the belt is wound onto the retractor, both the belt and the tongue assembly are moved by the retractor. Since both the belt and tongue assembly are moved by the retractor, the retractor must have a relatively strong wind-up spring. The wind-up spring must be capable of exerting enough force on the belt to move the combined weight of the belt and the tongue assembly. When the belt is in use, the relatively large force exerted by the retractor wind-up spring results in the belt being pulled across the torso of an occupant of the vehicle with a force which the occupant may find to be objectionably large.

SUMMARY OF THE INVENTION

An improved tongue assembly constructed in accordance with the present invention is used in a safety apparatus having a belt to restrain movement of an occupant of a vehicle. The tongue assembly includes a base having an opening through which the belt extends. A bar spans the opening in the base and is slidable relative to the base. The belt extends across and engages an intermediate portion of the bar. A cover is supported on the base, engages end portions of the bar, and retains the bar on the base.

In one embodiment of the invention, the end portions of the bar are connected with the cover so that the cover and bar slide together along the base to grip the belt between the bar and the base. In another embodiment of the invention, the bar is movable relative to the cover. In this embodiment of the invention, the cover remains stationary relative to the base and the bar slides relative to both the cover and the base to grip the belt.

BRIEF DESCRIPTION OF THE DRAWINGS

Further features of the present invention will become apparent to those skilled in the art to which the present invention relates from reading the following specification with reference to the accompanying drawings, in which:

FIG. 7 is a plan view, generally similar to FIG. 2, illustrating the relationship between the belt and tongue assembly when the tongue assembly is positioned for engagement with a buckle;

FIG. 8 is an enlarged sectional view, taken generally along the line 8—8 of FIG. 7, illustrating the manner in which the belt is gripped to hold it against movement relative to the base;

FIG. 9 is a sectional view, generally similar to FIG. 6, of a second embodiment of the tongue assembly, the tongue assembly being illustrated in a disconnected condition; and FIG. 10 is a sectional view of the tongue assembly of FIG. 9 illustrating the tongue assembly in a connected condition in which the belt is gripped to hold it against movement relative to the base.

DESCRIPTION OF SPECIFIC PREFERRED EMBODIMENTS OF THE INVENTION

Figure 1:
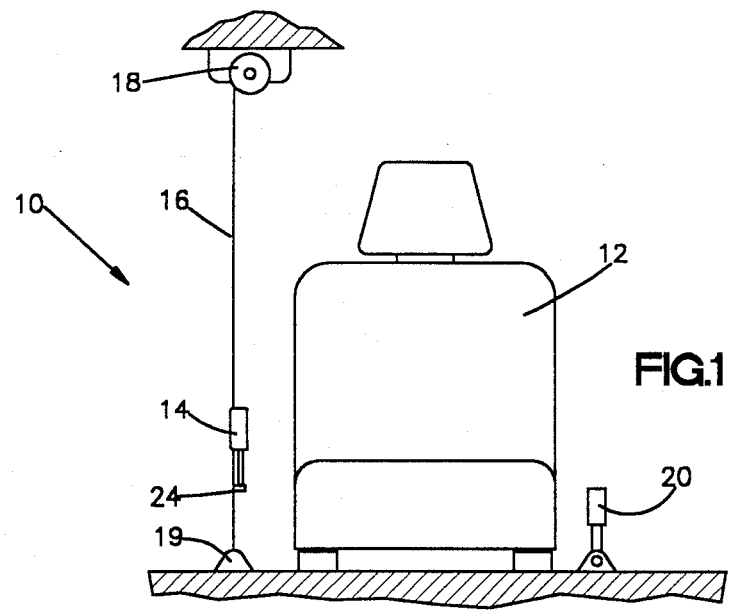
FIG. 1 is a schematic illustration of a vehicle seat and a safety apparatus for use in restraining movement of an occupant of the seat.

The present invention is illustrated (FIG. 1) as applied to a seat belt system 10 for use in restraining an occupant of a vehicle against movement relative to the vehicle. It should be understood that the invention could be applied to other seat belt systems. During operation of the vehicle, an occupant of the vehicle sits on a seat 12. The seat belt system 10 is engaged to restrain the occupant against movement relative to the vehicle and the seat 12.

The seat belt system 10 includes a safety belt 16 attached at one end to a stationary mounting 19 on the frame of the vehicle adjacent one side of the seat. At its opposite end, the belt 16 is attached to a retractor assembly 18 secured to the vehicle. Intermediate its ends, the belt passes through a tongue assembly 14, which is located against a stop 24 secured to the belt. When not in use, the belt is wound on the retractor and is oriented generally vertically on one side of the seat with the tongue assembly 14 held up by the stop 24.

To engage the seat belt system 10, the tongue assembly 14 is manually grasped and the safety belt 16 is pulled across the lap and torso of the occupant sitting in the seat 12. As the tongue assembly 14 is pulled across the lap and torso of the occupant of the seat 12, the tongue assembly moves along the safety belt 16 and the belt 16 is unwound from the retractor assembly 18. When the safety belt 16 has been pulled across the lap and torso of the occupant of the vehicle, the tongue assembly 14 is connected with a buckle 20. The buckle 20 is connected to the frame of the vehicle and is disposed on a side of the seat 12 opposite the stationary mounting 19.

Figure 5:
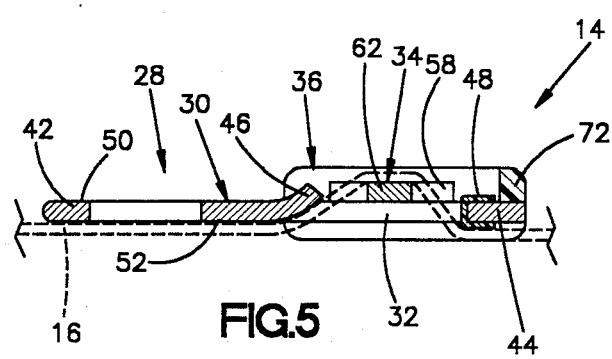
FIG. 5 is a sectional view, taken generally along the line 5—5 of FIG. 2, illustrating the manner in which the belt extends through an opening in the base, across the bar and back through the opening in the base.

The tongue assembly 14 (FIG. 2) has a base 28 which includes a metal base plate 30. The base plate 30 has a rectangular opening 32 which is spanned by a metal bar 34. A cover 36, formed of a polymeric material, is supported on the base plate 30 and retains the bar 34 on the base plate 30. The metal base plate 30 (FIGS. 2 and 5) has an outer or first end portion 42 to engage the buckle 20 (FIG. 1). The base plate 30 also has an inner or second end portion 44 in which the rectangular opening 32 is formed. The belt 16 extends through the opening 32, over the bar 34, and back through the opening, as shown in FIGS. 5 and 8.

The inner end portion 44 of the base plate 30 also may have an optional curved guide flange 46 (FIGS. 2 and 5) located on the edge of the opening 32 closest to the outer end portion 42. The guide flange 46 promotes easy movement of the tongue assembly 14 along belt 16.

In addition to the base plate 30, the base 28 may include a belt guard 48 located on the edge portion of opening 32 farthest away from the outer end portion 42 of the base plate. The belt guard 48 protects the belt 16 during movement of tongue assembly 14 along the belt. The belt guard 48 may be formed of either metal or a polymeric material. If the base 28 of the tongue assembly 14 does not include the belt guard 48, the edge portion of opening 32 farthest away from the outer end portion 42 is chamfered to minimize belt wear.

Figure 3:
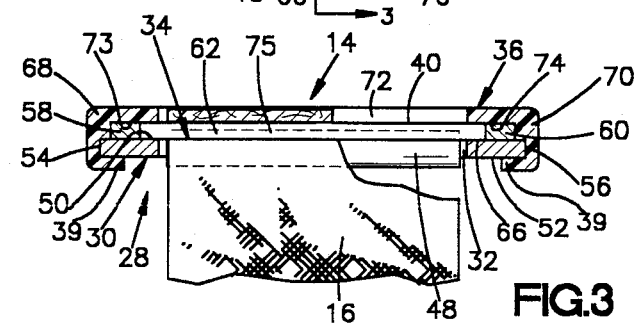
FIG. 3 is a sectional view, taken generally along the line 3—3 of FIG. 2, illustrating the relationship between a base, bar and cover of the tongue assembly.

The base plate 30 has a first flat major side surface 50 (FIG. 5) and a second flat major side surface 52. The major side surfaces 50, 52 are interconnected by opposite and parallel minor side surfaces 54, 56 (FIG. 3). The bar 34 and the cover 36 slidably engage the upper (as viewed in FIGS. 3 and 5) major side surface 50. The cover 36 also has opposite flanges 39 which slidably engage the two opposite and parallel minor side surfaces 54, 56 (FIG. 3) and major surface 52 of the base plate 30.

The bar 34 has a first end portion 58 (FIG. 2), a second end portion 60 and a straight intermediate portion 62 which interconnects the first and second end portions 58, 60. Together, the first and second end portions 58, 60 and the intermediate portion 62 define a flat upper surface that engages the cover 36. Opposite and generally parallel to the flat upper side surface 40 is a flat lower side surface 66 of the bar 34. The flat lower side surface 66 engages and is slidable along the upper surface 50 of the base plate 30.

Figure 2:
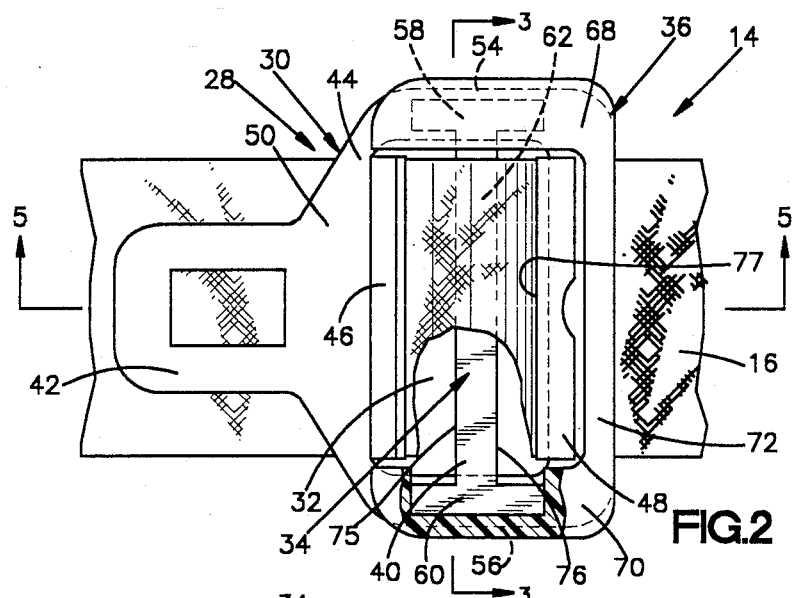
FIG. 2 is a plan view illustrating the relationship between a tongue assembly constructed in accordance with the present invention and a belt of the safety apparatus of FIG. 1.

The cover 36 has a generally U-shaped configuration in plan view (FIG. 2) and is molded in one piece of a polymeric material. The cover 36 has a first guide section 68 and a second guide section 70 (FIG. 2). The first guide section 68 of the cover 36 engages the first end portion 58 of the bar 34 and one minor side surface 54 of the base plate 30. The second guide section 70 of the cover 36 engages the second end portion 60 of the bar 34 and the other minor side surface 56 of the base plate 30. The first guide section 68 of the cover 36 guides motion of the first end portion 58 of the bar 34 relative to the base plate 30. The second guide section 70 of the cover 36 guides motion of the second end portion 60 of the bar 34 relative to the base plate 30.

Figure 4:
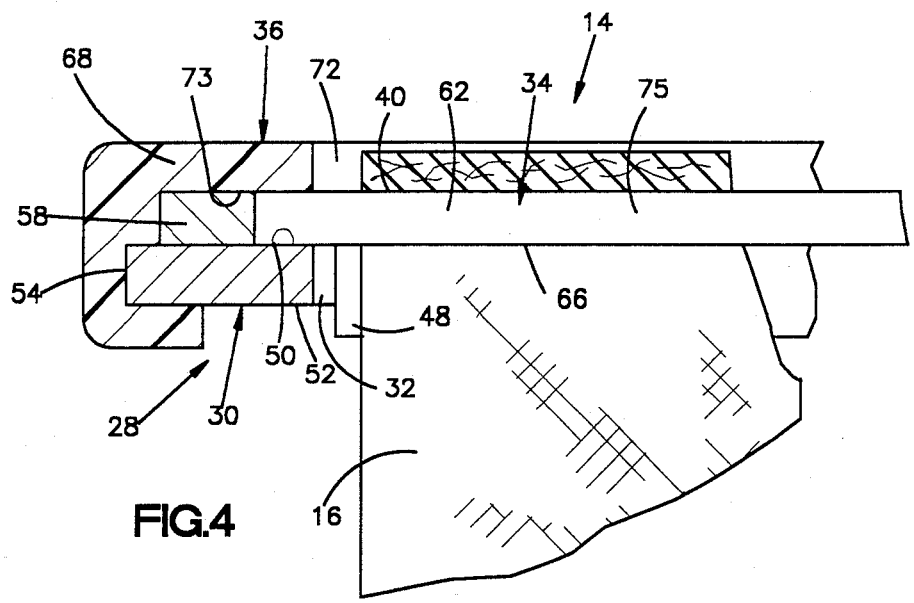
FIG. 4 is an enlarged fragmentary view of a portion of FIG. 3 further illustrating the relationship between the belt and components of the tongue assembly.

Formed in the guide sections 68 and 70 of the cover 36 are a pair of recesses 73 and 74 (FIGS. 3 and 4) in which opposite end portions 58 and 60 of the bar 34 are received. The recesses 73 and 74 cooperate with the bar 34 to maintain longitudinal edge portions 75 and 76 (FIG. 2) of the intermediate portion 62 of the bar parallel to an edge portion 77 of the belt guard 48. The recesses also insure that the cover and the bar slide together on the base plate 30.

The cover 36 (FIG. 2) also has a connector section 72 extending between the first guide section 68 and the second guide section 70. The connector section 72 of the cover 36 is spaced apart from the intermediate portion 62 of the bar 34. The connector section 72 of the cover 36 prevents angular displacement between the two guide sections 68 and 70 and thereby promotes smooth movement of the cover 36 and bar 34 relative to the base plate 30.

The thickness of the cover 36 is such that the belt 16 does not project outwardly from the flat surface 40 of the bar 34 by a distance which is greater than the extent to which the cover projects outwardly from the flat surface 40 of the bar. Therefore, the portion of the belt 16 which overlies the surface 40 of the bar 34 is disposed within the spatial envelope defined by the cover 36. The thickness of the tongue assembly 14 is determined by the thickness of the base plate 30 and the cover 36. With the tongue assembly 14 having a low profile, there is minimal interference between the occupant of the vehicle and the tongue assembly.

Figure 6:
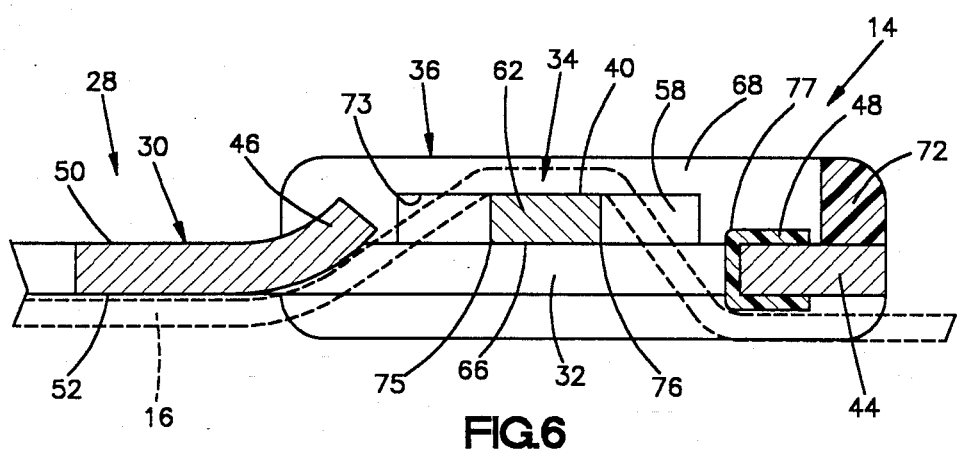
FIG. 6 is an enlarged view of a portion of FIG. 5 further illustrating the relationship between the components of the tongue assembly and the belt.

When the tongue assembly 14 is in the position illustrated in FIG. 1, the buckle 20 (FIG. 1), the bar 34 and the cover 36 are in a position relative to the base plate 30 in which the bar 34 extends across approximately the center of the opening 32 (FIGS. 2, 5 and 6). The lower side surface 66 of the bar (FIG. 8) engages the base plate 30. The belt 16 extends through the opening 32 in the base plate, across the flat upper side surface 40 of the bar, and back through the opening 32. The belt 16 directly engages the exposed surface 40 of the metal bar 34.

When the tongue assembly 14 is connected to the buckle 20, the buckle engages the first end portion 42 of the base plate 30. The bar 34 and the cover 36 are pulled rearwardly on the base plate 30 by the spring force of the retractor 18 acting through the belt 16 (FIGS. 7 and 8). The intermediate portion 62 of the bar 34 presses the belt 16 against the belt guard 48 on the base plate 30 (FIGS. 7 and 8). The edge portion 76 of the bar 34 and the edge portion 77 of the belt guard 48 cooperate to grip the belt 16 over its entire width to minimize stress concentrations in the belt. The belt 16 is gripped between the intermediate portion 62 of the bar 34 and the guard 48 to hold the belt and tongue assembly 14 against movement relative to each other. If the guard 48 were eliminated, the belt 16 would be gripped between the intermediate portion 62 of the bar 34 and the base plate 30. Restraining forces applied to the belt 16 will be transmitted to the base 30 and buckle 20. Therefore, the restraining forces are transmitted through relatively strong metal components of the tongue assembly 14.

When the tongue assembly 14 is disconnected from the buckle, the bar 34 is moved to a position in which it does not grip the belt, and there is a minimum amount of friction between the belt 16 and the tongue assembly 14. This allows the tongue assembly 14 and belt 16 to move easily relative to each other. When the belt 16 is being wound on the retractor 18 (FIG. 1), the belt moves freely through the tongue assembly 14. The stop 24 on the safety belt 16 limits movement of the tongue assembly 14 relative to the belt 16 and holds the tongue assembly in the position in which it may be grasped by the occupant of the vehicle. Therefore, the retractor 18 (FIG. 1) must only pull the weight of the belt 16. Thus, a relatively small retraction force is required, and the retractor 18 (FIG. 1) may have a weak wind-up spring which applies a minimal force to the belt 16 and occupant of the vehicle when the tongue assembly 14 is connected to the buckle 20.

In the embodiment of the invention illustrated in FIGS. 1 through 8, the bar 34 and the cover 36 slide relative to the base plate 30. In a second embodiment of the invention, illustrated in FIGS. 9 and 10, the bar slides relative to the cover and base plate. Since the embodiment of the invention illustrated in FIGS. 9 and 10 is generally similar to the embodiment of the invention illustrated in FIGS. 2-8, similar numerals will be utilized to designate similar components, the suffix letter "a" being associated with the numerals of FIGS. 9 and 10 to avoid confusion.

The tongue assembly 14a of FIGS. 9 and 10 includes a base plate 30a with a first or outer end portion 42a and a second or inner end portion 44a. The outer end portion 42a of the base plate 30a has an opening (not shown) which is engageable with buckle. This allows the restraining forces in a belt 16a to be transmitted through the tongue assembly 14a and to the buckle when the tongue assembly is connected with the buckle. The inner end portion 44a of the base plate 30a has a rectangular opening 32a. The belt 16a extends through the opening 32a, across a bar 34a, and back through the opening 32a. Therefore, the restraining forces in the belt 16a are transmitted through the bar 34a to the base plate 30a. The opening 32a has an edge portion 77a which is chamfered to prevent the belt 16a from wearing while moving relative to the base plate 30a.

The bar 34a of the tongue assembly 14a has a longitudinally extending groove 78a which is partially defined by a first flange section 80a and a second flange section 82a. The belt 16a engages upper surfaces (as viewed in FIGS. 9 and 10) of the first and second flange sections 80a and 82a so that the belt 16a spans the groove 78a. By having the belt 16a span the groove 78a, the amount of sliding friction between the belt and the bar 34a is minimal. Therefore, the tongue assembly 14a can move easily relative to the belt 16a when in the disconnected condition.

The bar 34a has a first end portion 58a and a second end portion 60a (not shown in FIGS. 9 and 10) of similar configuration. The end portions 58a and 60a of the bar 34a are slidably connected with the base plate 30a and the cover 36a. This allows the bar 34a to slide relative to the cover 36a and the base plate 30a.

The first and second end portions 58a and 60a of the bar 34a are interconnected by an intermediate portion 62a. The intermediate portion 62a of the bar 34a spans the opening 32a in the base plate 30a. The belt 16a is extended upwardly (as viewed in FIGS. 9 and 10) through the opening 32a, across the bar 34a and back downwardly through the opening.

The cover 36a of the tongue assembly 14a is made of a polymeric material. The cover 36a has a generally rectangular shape with a central rectangular opening 84a. The cover 36a has a first guide section 68a and a second guide section 70a (not shown in FIGS. 9 and 10) of similar configuration. The first guide section 68a is slidably interconnected with the first end portion 58a of the bar 34a. The second guide section 70a of the cover 36a is slidably interconnected with the second end portion 60a of the bar 34a. The guide sections 68a and 70a are fixedly connected with the base plate 30a. Therefore, the bar 34a slides relative to the cover 36a and the base plate 30a.

From the above description of a preferred embodiment of the present invention, those skilled in the art will perceive improvements, changes and modifications in the invention. Such improvements, changes and modifications within the skill of the art are intended to be covered by the appended claims.

Having described preferred embodiments of the invention, the following is claimed:

1. A tongue assembly for use in a safety apparatus having a belt for restraining movement of an occupant of a vehicle, said tongue assembly comprising:
    a base having an opening through which the belt can extend;
    a bar spanning the opening in said base and enabling the belt to extend through the opening, across the bar and back through the opening, said bar having first and second end portions and an intermediate portion disposed between said first and second end portions, said intermediate portion of said bar having surface means for engaging the belt, said bar being slidable relative to said base to enable said intermediate portion of said bar to engage the belt and press the belt against the base; and
    a cover supported on said base and engaging said first and second end portions of said bar to retain said bar on said base and to guide movement of said bar relative to said base, said cover being spaced from the surface means of said intermediate portion of said bar.

2. A tongue assembly as set forth in claim 1 wherein said cover is fixedly connected to said base and said bar is slidable relative to said cover and said base.

3. A tongue assembly as set forth in claim 1 wherein said bar has a longitudinally extending groove which is at least partially defined by first and second longitudinally extending flange sections which extend outwardly from a bottom portion of the groove, said surface means being disposed on said first and second flange sections to enable said surface means to engage the belt on opposite sides of the groove and to hold the belt out of engagement with the bottom portion of the groove so that the belt spans the groove to thereby minimize sliding friction between the belt and said bar.

4. A tongue assembly for use in a safety apparatus having a belt for restraining movement of an occupant of a vehicle, said tongue assembly comprising:
    a base having an opening through which the belt can extend;
    a bar spanning the opening in said base and enabling the belt to extend through the opening, across the bar and back through the opening, said bar having first and second end portions and an intermediate portion disposed between said first and second end portions, said intermediate portion of said bar having surface means for engaging the belt; and
    a cover supported on said base and engaging said first and second end portions of said bar to retain said bar on said base, said cover being spaced from the surface means of said intermediate portion of said bar, said bar being slidable relative to said base to enable said intermediate portion of said bar to engage the belt and press the belt against the base;
    said cover including a first guide section which engages both said base and said first end portion of said bar and guides movement of said first end portion of said bar relative to said base, a second guide section which engages both said base and said second end portion of said bar and guides movement of said second end portion of said bar relative to said base, and a connector section extending between said first and second guide sections, said connector section being spaced from the surface means of said intermediate portion of said bar to enable the belt to engage the surface means of said intermediate portion of said bar.

5. A tongue assembly as set forth in claim 4 wherein said base includes a first end portion adapted to be engaged by a buckle and a second end portion opposite from said first end portion, said connector section of said cover being disposed in abutting engagement with said second end portion of said base so that the belt can extend through the opening between said connector section and said bar.

6. A tongue assembly for use in a safety apparatus having a belt for restraining movement of an occupant of a vehicle, said tongue assembly comprising:
   a base having an opening through which the belt can extend;
   a bar spanning the opening in said base and enabling the belt to extend through the opening, across the bar and back through the opening, said bar having first and second end portions and an intermediate portion disposed between said first and second end portions, said intermediate portion of said bar having surface means for engaging the belt; and
   a cover supported on said base and engaging said first and second end portions of said bar to retain said bar on said base, said cover being spaced from the surface means of said intermediate portion of said bar, said bar being slidable relative to said base to enable said intermediate portion of said bar to engage the belt and press the belt against the base;
   said cover including a first guide section which engages both said base and said first end portion of said bar and guides movement of said first end portion of said bar relative to said base and a second guide section which engages both said base and said second end portion of said bar and guides movement of said second end portion of said bar relative to said base, said first and second guide sections being dimensioned relative to the belt such that when the belt extends across the bar said guide sections project outwardly from said bar for a distance which is greater than the thickness of the belt and are spaced apart a distance which is at least as great as the width of the portion of the belt extending across said bar.

7. A tongue assembly for use in a safety apparatus having a belt for restraining movement of an occupant of a vehicle, said tongue assembly comprising:
   a base having an opening through which the belt can extend;
   a bar spanning the opening in said base and enabling the belt to extend through the opening, across the bar and back through the opening, said bar having first and second end portions and an intermediate portion disposed between said first and second end portions, said intermediate portion of said bar having surface means for engaging the belt; and
   a cover supported on said base and engaging said first and second end portions of said bar to retain said bar on said base, said cover being spaced from the surface means of said intermediate portion of said bar, said bar being slidable relative to said base to enable said intermediate portion of said bar to engage the belt and press the belt against the base;
   said cover being connected to said end portions of said bar so that the cover and said end portions are slidable together relative to said base.

* * * * *

UNITED STATES PATENT AND TRADEMARK OFFICE
CERTIFICATE OF CORRECTION

PATENT NO. : 4,878,271

DATED : November 7, 1989

INVENTOR(S) : Alexander P. Kotikovsky

It is certified that error appears in the above-identified patent and that said Letters Patent is hereby corrected as shown below:

On the title page, under item [19] and in item [75], change inventor's name from "kitokovsky" to --Kotikovsky--.

Signed and Sealed this

Sixteenth Day of October, 1990

Attest:

HARRY F. MANBECK, JR.

*Attesting Officer*  *Commissioner of Patents and Trademarks*